Figure 1:
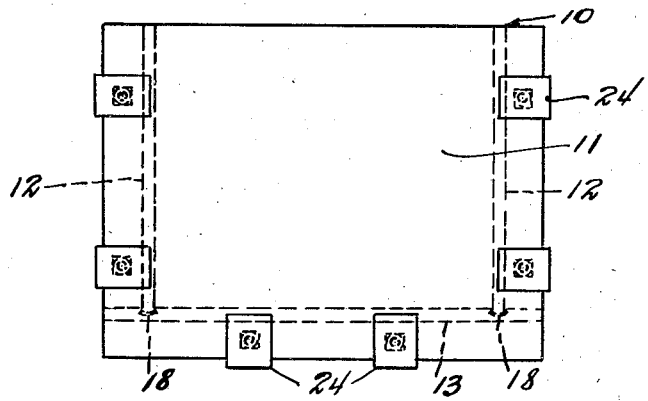

Oct. 2, 1945.  M. S. TARNOPOL  2,385,954

GLASS TANK

Filed May 30, 1944

Inventor
MILTON S. TARNOPOL

By Olen E. Bee
Attorney

Patented Oct. 2, 1945

2,385,954

UNITED STATES PATENT OFFICE 2,385,954

GLASS TANK

Milton S. Tarnopol, Brackenridge, Pa., assignor to Pittsburgh Plate Glass Company, Allegheny County Pa., a corporation of Pennsylvania Application May 30, 1944, Serial No. 538,031

2 Claims. (Cl. 206—2)

This invention relates to containers for liquids which are corrosive in nature, or which are readily contaminated, and it has particular relation to containers of this type primarily constructed of several plates or sheets of glass.

One object of the invention is to provide an improved container for corrosive liquids and in which there are no corrodible metal parts exposed to the contents of the container.

Another object of the invention is to provide an improved container having a structure of glass plates combined with assembling elements for holding the glass plates in an assembled relation.

In many industries there is a demand for relatively large containers which are highly resistant to corrosion by acids, cleaning fluids, and the like. Glass is adaptable as a suitable material for building such containers and it has been so used in the manufacture of bottles, or as a lining for metallic tanks and similar containers. However, difficulties are encountered in constructing containers of this type in large sizes. Articles, such as bottles and similar blown or pressed containers of necessity are limited in size and in many instances are relatively fragile. Glass lined metallic constructions are very expensive and include a great proportion of metal which under present conditions is difficult to obtain. These glass lined metallic contains also have the disadvantage of exposure of the metal to corrosive action of acids in the event glass becomes broken or cracked.

In one form of the invention described herein there is provided a container comprising relatively large plates or sheets of glass so assembled and arranged that the faces of certain of the plates are firmly pressed against the edges of other plates to insure an efficient fluid-tight seal. A special arrangement of tie rods and clamps is included in the structure to hold the glass plates firmly together without the necessity of forming openings or notches in the glass.

Figure 2:
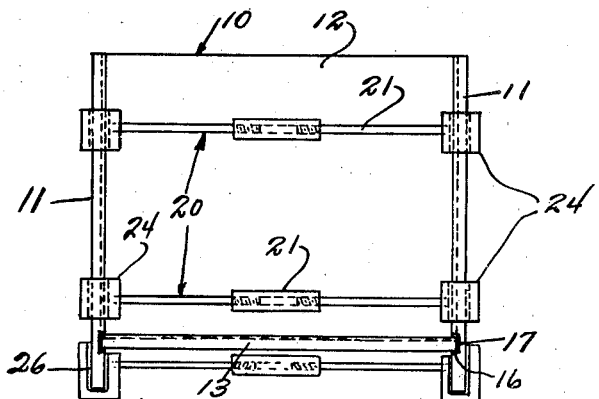
Figure 3:
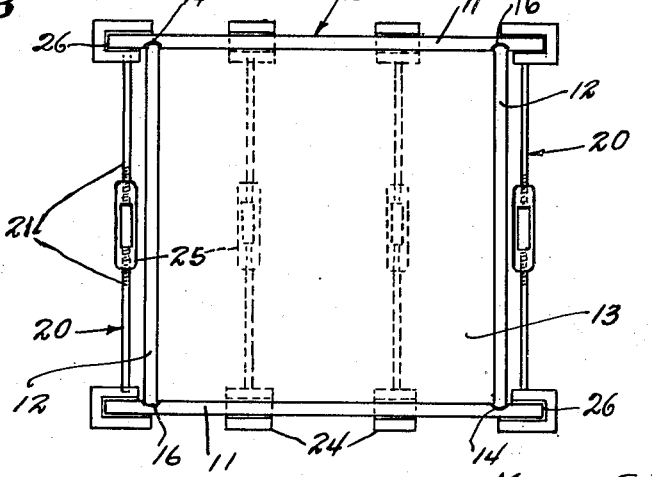

In the drawing:

Fig. 1 is a side elevation of a tank in which the invention has been incorporated; Fig. 2 is an end elevation of the structure shown in Fig. 1; and Fig. 3 is a plan of the construction shown in Figs. 1 and 2.

In practicing the invention a tank or container 10 comprises a pair of opposed glass side plates 11, a pair of opposed glass end plates 12, and a glass bottom plate 13. It is to be noted that the bottom plate is substantially shorter than the side plates. All of these plates are composed of relatively heavy glass, for example, glass plates of ¼ to 1½ inches in thickness and preferably being tempered or semi-tempered to the extent that such plates have been heated approximately to the point of softening and then subjected to sudden chilling by applying jets of cold air against the surfaces thereof.

The side plates 11 are formed with shallow vertical grooves 14 spaced a substantial distance from the margins of the glass and being designed to receive opposite side edges of the end plates 12. If desired, a packing 16 or sealing material, such as resin impregnated tape, is disposed in the grooves between the glass surfaces in order to prevent grinding action of glass on glass and also to perfect a liquid-tight seal. Horizontal grooves 17 similar in form to the grooves 14 are provided in the side plates 11 above the lower edges thereof to receive the opposite edges of the bottom plate 13. Likewise, the upper side of the bottom plate 13 is formed with grooves 18 to receive the bottom edges of the end plates 12. All of these grooves 14, 17 and 18 are provided with the packing 16 to insure fluid-tight sealing of all of the joints of the glass container.

The side plates 11 are secured in position and urged against the bottom and end plates by means of metal clamping devices 20. Each of the latter devices includes tie rods 21, the outer ends of which are screw-threaded or otherwise securely mounted in the sides of U-shaped clamps 24. The opposed inner ends of the rods 21 are screw-threaded in opposite directions into opposite ends of turnbuckles 25. The U-clamps 24 fit around the extending end and bottom edges of the side plates 11. Preliminary adjustment of the turnbuckles is effected to space the U-clamps properly for fitting the glass edges. Then the turnbuckles are adjusted to apply to desired pressure on the glass plates and to maintain fluid-tight engagement of the plate edges in the packing lined grooves 14, 17 and 18. The inner sides of the U-clamps are lined with suitable yieldable or resilient packing 26, such as lead, fiber glass, asbestos, rubber composition, or similar material, to prevent contact of the metal clamps with the glass and to serve as a cushioning medium. This packing also permits relative expansion and contraction of the glass and metal parts resulting from differentials in coefficients of expansion of these materials at varying temperatures.

Since the assembled glass plates of the container or tank are in the form of tempered or semi-tempered glass, certain rules of construction should be observed. It is desirable that the grooves 14, 17 and 18 be appreciably wider at their widest points than the edges of the glass plates having bearing relation therein in order to allow for a certain degree of irregularity in the plates. The grooves may vary in depth depending upon the thickness of the glass plates. For example, in glass plates having ⅝ inch thickness the groove should be about ⅛ of an inch deep. In plates having 1 inch thickness the groove may be 3/16 of an inch deep. If these values were substantially exceeded there would be likelihood that the tempered glass plates would shatter.

The grooves in the glass plates should all be formed prior to the tempering operation. However, it is to be understood that if desired even after the plates have been tempered, the edges thereof can be slightly ground into grooves of adjacent plates by interposing emery powder between the contiguous surfaces and then rotating the opposite edges of the plate back and forth through short arcs about the edges in the grooves as pivot points. In this way the mating surfaces can be ground to provide a more accurate fit. It is also to be understood that a grinding action can be effected by sliding the plates back and forth in a lineal movement to cause the edge resting in the groove to move longitudinally therein, or sliding and rotary movement may be combined.

The constructions shown herein and described are simple in design. There are only a few metallic parts which are completely protected from contact with any corrosive material within the container. The assembly of glass and clamping devices can be demounted without difficulty and can be readily reassembled. Such flexibility facilitates shipment and storage. Also the condition of the contents of the containers can be readily observed through the transparent container walls.

Although only one form of the invention has been shown and described in detail, it will be apparent to those skilled in the art that the invention is not so limited, but that various changes can be made therein without departing from the spirit of the invention or from the scope thereof so long as such changes are within the scope of the appended claims.

What I claim is:

1. In a corrosion resisting tank, opposite plate glass side walls, opposite plate glass end walls, and a plate glass bottom, the several glass plates at their junction with one another having interfitting groove and edge connections, sealing material at the junction of the groove and edge connections to produce fluid-tight joints, pairs of metal U-clamps fitting around edge portions of the plates along the sides and bottom of the tank, clamps of each pair being disposed in opposed relation on opposite walls of the tank, yieldable cushioning material disposed in each clamp between the inner surface thereof and the surface of the glass plate on which it is mounted to insulate metal clamping material from the glass, and a tie rod including a turnbuckle connecting the inner sides of clamps of each pair inwardly of the adjacent glass edges and holding the glass plates in assembled relation with the groove fitting edges thereof pressed in fluid-tight relation in their receiving grooves.

2. In a corrosion resisting tank, opposite upright glass side plates having horizontal grooves formed therein adjacent their lower inner edges and having vertical grooves formed therein adjacent their opposite end portions to communicate with the horizontal grooves, opposite upright end plates disposed between the side plates and having their opposite edges fitted into the upright grooves, a horizontal bottom plate having grooves formed in its upper side adjacent opposite ends thereof and receiving therein the lower edges of the end plates and having its opposite side edges fitted into said horizontal grooves, pairs of U-clamps fitting around the vertical and lower edges of the side plates, clamps of each pair being disposed in opposed relation on opposite side plates, yieldable insulating material disposed in the clamps between the glass and clamp surfaces, and a tie rod including a turnbuckle connecting the clamps of each pair and holding the glass plates in assembled relation with the groove fitting edges thereof pressed in fluid-tight relation in their receiving grooves.

MILTON S. TARNOPOL.